United States Patent Office 3,354,126
Patented Nov. 21, 1967

3,354,126
POLYESTER-POLYAMIDES CONTAINING AZIRIDINE GROUPS
George E. Ham, Lake Jackson, and Jane E. Stevens, Austin, Tex., assignors to The Dow Chemical Company, Midland, Mich., a corporation of Delaware
No Drawing. Filed Mar. 11, 1964, Ser. No. 351,215
13 Claims. (Cl. 260—78)

This invention relates to polyester-polyamides, to such polymers containing aziridine groups, to cured resins derived from such polymers and to processes for making and curing such polymers.

The polymers containing aziridine groups are linear polyester-polyamides consisting essentially of units having the Formula I

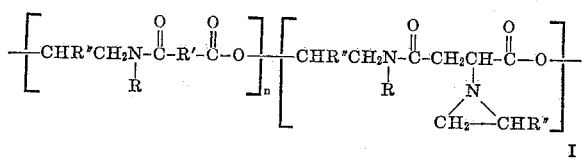

wherein R is a lower alkyl radical free of substituents reactive with the aziridine ring, R' is the divalent hydrocarbon radical formed by removal of the carboxyl groups from a dicarboxylic acid, each R" is hydrogen or a lower alkyl hydrocarbon radical and $n$ is a number having an average value of 0 to 2 and may be different in successive polymer units. By the term "lower alkyl" as used herein, is meant alkyl of 1 to 4 carbon atoms.

As is evident from the above formula, the polymers consist essentially of the units shown in the second bracket, which units may optionally be randomly interspersed with up to twice as many of the units shown in the first bracket. It is also to be understood that the R" attached to the aziridine ring may or may not be the same as the R" attached directly to the back-bone chain of the polymer.

In general, the polymers of the invention having the above formula are low-melting light-colored solids are are readily soluble in many organic solvents but substantially insoluable in water. They are easily fabricated by molding or extrusion and readily form surface coatings when applied as a solution in a volatile solvent. They have the unusual and valuable property that they can be cured, i.e., crosslinked, by contact with polyfunctional reactants capable of opening the aziridine ring. Such reactants include polycarboxylic acids and their anhydrides, diepoxides, etc. The cured resins are hard, transparent and infusible and are highly resistant to most organic solvents. A particularly useful curing agent is a copolymer of maleic anhydride which retains the acid anhydride structure, such as a copolymer with styrene. Valuable surface coatings are thus obtained when a solution of a polymer of the invention is mixed with a solution of a styrene-maleic anhydride copolymer, the solution is applied to a surface, the solvent is evaporated and the resulting film is cured by baking.

The aziridinyl polymers of the invention are conveniently made by condensing an aziridine having the Formula II $$CH_2-CHR''$$
$$\diagdown NH \diagup$$

II with a polyester-polyamide having the Formula III

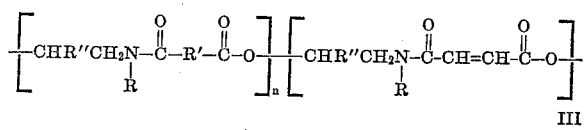

wherein R, R', R" and $n$ have the same significance as above. The condensation is conveniently effected by heating a mixture of the two reactants at about 50–100° C. until the reaction is complete. Since the aziridine is sensitive to acids, it is essential that the ester-amide be free of acid groups. This is easily assured by the use of an excess of a tertiary amine to neutralize such groups. A volatile amine, such as triethyl- or tributyl-amine is preferred because of the ease of its removal from the product. Somewhat similar condensation of an aziridine with an unsaturated polyester resin have been described by Huttel et al., Farbe and Lack, 67, 71–80 (1961) and in the copending application of McLendon and Dick, Ser. No. 266,526, filed Mar. 20, 1963, now Patent No. 3,262,991.

The above unsaturated polyester-polyamide used in making the aziridinyl polymer are conveniently made by condensing an aziridine having the Formula IV $$CHR''-CH_2$$
$$\diagdown NR \diagup$$

IV with maleic anhydride or a mixture of maleic anhydride and another anhydride having the Formula V

V wherein R, R' and R" have the same significance as above. Such a condensation with a single acid anhydride, phthalic anhydride, is disclosed in British Patent 784,059. The product of the reference process, however, is useless in the present invention since it is incapable of condensing with an aziridine as described herein. The general procedure and reaction conditions useful in the process of the British patent are also useful in the present invention for making the above unsaturated polyester-polyamides.

In making the above unsaturated polymer, maleic anhydride may be used exclusively or it may be mixed with up to about two molar equivalents of one or more other dicarboxylic acid anhydrides. Suitable such anhydrides include phthalic, succinic, adipic, sebacic and dimerized fatty acid anhydrides, and, in fact, any acid anhydride of the above formula wherein R' is hydrocarbon or is free of reactive substituents.

Any aziridine having the above formula can be used to make the unsaturated polymer. The alkyl radical on the nitrogen atom may be substituted with inert groups, such as phenyl, cyano or carboxyalkyl.

The practice of the invention is illustrated by the following examples.

*Example I*

Maleic anhydride (19.6 grams, 0.20 mole), 29.6 grams (0.20 mole) of phthalic anhydride and 58.8 grams (0.40 mole) of 1-(2-phenethyl) aziridine were dissolved in 1300 ml. of dry benzene and the mixture heated at reflux temperature for 4 hours. After this time the benzene was removed under vacuum leaving 107.7 grams of a light brown polymer with M.P. 55–57° C.

*Analysis.*—Calc. for $C_{32}H_{32}N_2O_6$: percent N, 5.58. Found: percent N, 5.01. Infrared analysis was consistent with the unit structure having the Formula VI:

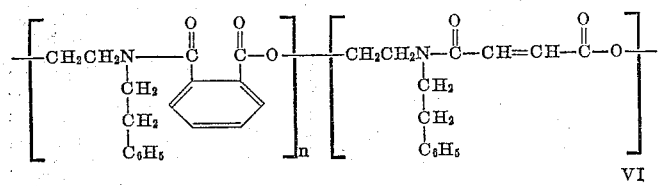

VI wherein *n* has an average value of one.

A portion of the above polymer (50.0 grams) was dissolved in 150 ml. of methyl ethyl ketone containing 13.3 ml. of triethylamine. After standing at room temperature for 30 minutes a solution of 0.102 mole of ethylenimine in 50 ml. of methyl ethyl ketone was added to the mixture. The mixture was then heated at reflux temperature for 3 hours. After removal of the solvent under vacuum there was obtained 49.3 grams of a light brown solid. This polymer melted at 50–55° C. and had an infrared spectrum consistent with that expected for a polymer having the unit structure shown below. The polymer was not readily soluble in water.

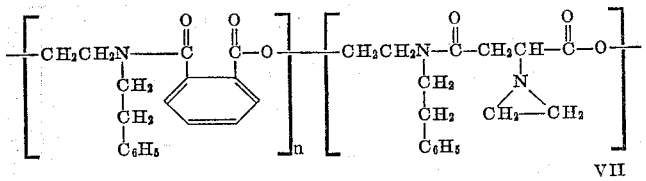

VII wherein *n* has an average value of one.

Example II

Maleic anhydride (19.6 grams, 0.20 mole), 29.6 grams (0.20 mole) of phthalic anhydride and 51.7 grams (0.40 mole) of 1-(2-acetoxyethyl)aziridine were dissolved in 1300 ml. of dry benzene and the mixture heated at reflux temperature for 4 hours. After removal of the solvent under vacuum there was obtained 82.7 grams of a white solid with M.P. 37–38° C.

*Analysis.*—Calc. for $C_{24}H_{28}N_2O_{10}$: percent N, 5.60. Found: percent N, 5.62. Infrared analysis was consistent with the expected structure.

A portion of the above polymer (50.0 grams) was dissolved in 150 ml. of methyl ethyl ketone containing 4.1 ml. of triethylamine. After standing at room temperature for 30 minutes a solution of 0.099 mole of ethylenimine in 50 ml. of methyl ethyl ketone was added to the solution and the mixture heated at reflux temperature for 3 hours. After removal of the solvent under vacuum there was obtained 53.1 grams of a light yellow solid which melted at 35–39° C. and had an infrared spectrum consistent with the expected structure as shown below. The polymer was not readily soluble in water.

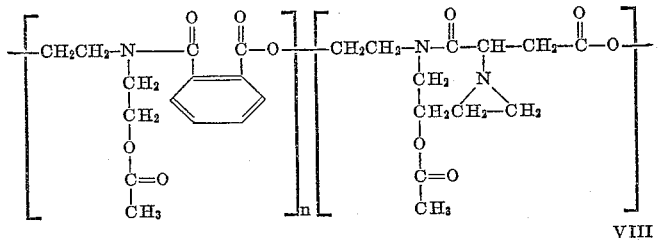

VIII

Example III

Maleic anhydride (19.6 grams, 0.20 mole), 29.6 grams (0.20 mole) of phthalic anhydride and 38.5 grams (0.40 mole) of 1-(2-cyanoethyl) aziridine were dissolved in 1300 ml. of dry benzene. The mixture was heated at reflux temperature for 4 hours. After removal of the solvent under vacuum there was obtained 61.3 grams of white solid which had a M.P. of 37–40° C. Infrared analysis of the polymer was consistent with the expected structure.

A portion of the above polymer (20.0 grams) was dissolved in 60.0 ml. of acetonitrile containing 6.49 grams of triethylamine and allowed to stand at room temperature for 30 minutes. A solution of 3.0 grams of ethylenimine in 20 ml. of acetonitrile was then added and the mixture heated at reflux temperature for 6.5 hours. After removal of the solvent under reduced pressure there was obtained 24.1 grams of light yellow solid which melted at 35–40° C. and had an infrared spectrum consistent with that expected for the polymer unit shown below. The polymer was not readily soluble in water.

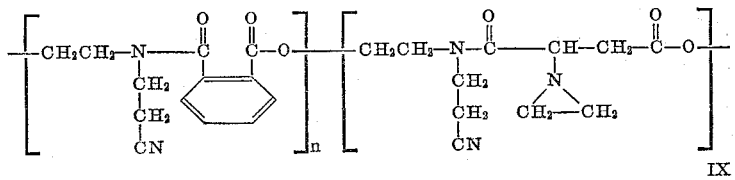

IX

Example IV.—Preparation of films from above polymers and various curing agents Three curing agents were used to produce hard, clear films from the above polymers. They were 2,2-bis(4-glycidyloxyphenyl) propane (DER 332), a copolymer of styrene and maleic anhydride containing 20.6 mole percent maleic anhydride (SMA 20.6% MA) and a copolymer of styrene and maleic anhydride containing 48.5% maleic anhydride (SMA 48.5% MA). The procedure for film preparation was as follows:

The polymer was dissolved in a small amount of methyl ethyl ketone or acetonitrile. An equivalent weight of curing agent based on the functional group of the curing agent (epoxy group for DER 332 and anhydride group for the SMA copolymers) per ethylenimine group in the polymer was dissolved in a separate small amount of methyl ethyl ketone. The solutions were rapidly mixed and spread on glass or bonderized steel plate. After evaporation of the solvent at room temperature the plates were placed in an oven at 140° C. After curing was complete they were tested for hardness, solvent resistance and adhesion. The following results were obtained. The polymer numbers correspond to the number of the example describing their production.

| Polymer | Curing Agent | Curing Time | Pencil Hardness | Solvent Resistance | | |
|---|---|---|---|---|---|---|
| | | | | Acetone | Ethylene Chloride | H₂O |
| I | SMA (48.5% MA) | 0.5 hr | 3H | Soft | N.E. | N.E. |
| I | SMA (20.6% MA) | 0.5 hr | 3H | Sol | N.E. | Sol. |
| I | DER 332 | 2.5 days | 3H | Sol | Soft | N.E. |
| III | DER 332 | 3 days | 5H | Sol | Sol | Sol. |

Sol.=Soluble; Soft.=Softens; N.E.=No effect.

The films had excellent adhesion.

The resins having the Formula I are likewise cured by being heated with monomeric anhydrides of polycarboxylic acids, such as phthalic, maleic, succinic, glutaric and alkenylsuccinic anhydrides. Likewise, copolymers of maleic anhydride with other vinyl monomers copolymerizable therewith are useful as curing agents. Such comonomers include ethylene, butadiene, acrylonitrile and acrylic acids and their esters and amides.

Products generally similar to those described above are obtained when 2-alkylaziridines are substituted for either or both of the aziridines used in making those described above; i.e., when R″ in the formulas herein represents methyl, ethyl, propyl or butyl radicals. In general such 2-alkylaziridines are notably less reactive than the unsubstituted aziridines; hence, reactions in which they are used usually require longer times and/or higher temperatures.

We claim:
1. A polyester-polyamide resin consisting essentially of units having the formula:

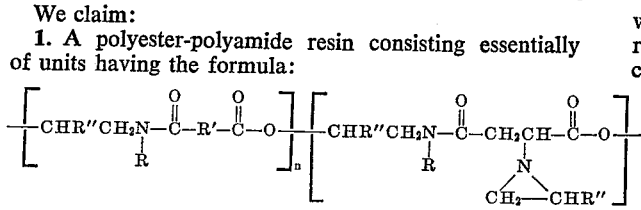

wherein R is a lower alkyl radical free of substituents reactive with the aziridine ring, R′ is the divalent hydrocarbon radical formed by removal of the caboxyl groups from a dicarboxylic acid, each R″ is hydrogen or a lower alkyl radical, and n is a number having an average value of 0 to 2 and may be different in successive polymer units.

2. A polyester-polyamide resin consisting essentially of units having the formula:

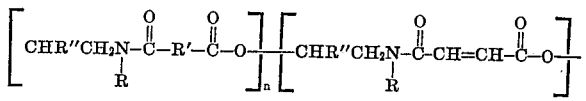

wherein R is a lower alkyl radical free of substituents reactive with the aziridine ring, R′ is the divalent hydrocarbon radical formed by removal of the carboxyl groups of a dicarboxylic acid, each R″ is hydrogen or a lower alkyl radical, and n is a number having an average value of 0 to 2 and may be different in successive polymer units.

3. A resin as defined in claim 1 wherein R″ is hydrogen.

4. A resin as defined in claim 3 wherein R′ is o-phenylene.

5. A resin as defined in claim 4 wherein R is 2-phenylethyl.

6. A resin as defined in claim 4 wherein R is 2-cyanoethyl.

7. A resin as defined in claim 4 wherein R is 2-acetoxyethyl.

8. A resin as defined in claim 2 wherein R″ is H.

9. A resin as defined in claim 8 wherein R′ is o-phenylene.

10. A resin as defined in claim 9 wherein R is 2-phenylethyl.

11. A resin as defined in claim 9 wherein R is 2-cyanoethyl.

12. A resin as defined in claim 9 wherein R is 2-acetoxyethyl.

13. The process of making the resin defined in claim 1 comprising reacting by contacting at about 50 to 100° C. (A) a resin consisting essentially of units having the formula

wherein R is a lower alkyl radical free of substituents reactive with the aziridine ring, R′ is the divalent hydrocarbon radical formed by removal of the carboxyl groups of a dicarboxylic acid, each R″ is hydrogen or a lower alkyl radical, and n is a number having an average value of 0 to 2 and may be different in successive polymer units, with (B) about one molar equivalent, based on the olefinic unsaturation in (A), of an aziridine having the formula

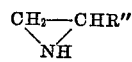

wherein R″ is as defined above.

References Cited

UNITED STATES PATENTS

| | | | |
|---|---|---|---|
| 2,765,294 | 10/1956 | England | 260—78 |
| 3,036,974 | 5/1962 | Trieschman et al. | 270—78 |
| 3,115,482 | 12/1963 | Smith | 260—78 |

WILLIAM H. SHORT, *Primary Examiner.*

H. D. ANDERSON, *Assistant Examiner.*